United States Patent
Ostrikov et al.

(10) Patent No.: US 11,258,772 B2
(45) Date of Patent: Feb. 22, 2022

(54) SECURED COMMUNICATION FROM WITHIN NON-VOLATILE MEMORY DEVICE

(71) Applicant: Cypress Semiconductor Corporation, San Jose, CA (US)

(72) Inventors: Sergey Ostrikov, Redwood City, CA (US); Stephan Rosner, Campbell, CA (US); Cliff Zitlaw, San Jose, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 120 days.

(21) Appl. No.: 16/431,548

(22) Filed: Jun. 4, 2019

(65) Prior Publication Data
US 2019/0386966 A1 Dec. 19, 2019

Related U.S. Application Data

(60) Provisional application No. 62/687,146, filed on Jun. 19, 2018.

(51) Int. Cl.
*H04L 29/06* (2006.01)
*G06F 21/78* (2013.01)
*G06F 13/42* (2006.01)

(52) U.S. Cl.
CPC ...... *H04L 63/0435* (2013.01); *G06F 13/4269* (2013.01); *G06F 21/78* (2013.01); *H04L 63/166* (2013.01)

(58) Field of Classification Search
CPC .............. H04L 63/0435; H04L 63/166; G06F 13/4269; G06F 21/78
See application file for complete search history.

(56) References Cited

U.S. PATENT DOCUMENTS 8,418,168 B2 4/2013 Tyhurst et al.
8,689,290 B2 4/2014 Buer
(Continued)

FOREIGN PATENT DOCUMENTS

CN 105933106 B 3/2019
ES 2616116 B1 4/2018
(Continued)

OTHER PUBLICATIONS

Daniel Zelle, et al., On Using TLS to Secure In-Vehicle Networks, ARES '17: Proceedings of the 12th International Conference on Availability, Reliability and Security Aug. 2017, Article No. 67, pp. 1-10.*

(Continued)

*Primary Examiner* — Jeffery L Williams

(57) ABSTRACT

An apparatus includes a non-volatile memory (NVM) device coupled to a host, the NVM device including a processing device to: receive a communication packet from a server via the host computing system that is coupled to the NVM device and communicatively coupled to the server, the communication packet comprising clear text data that requests to initiate secure communications; perform a secure handshake with the server, via communication through the host computing system, using a secure protocol that generates a session key; receive data, via the host computing system, from the server within a secure protocol packet, wherein the data is inaccessible to the host computing system; authenticate the data using secure protocol metadata (Continued)

of the secure protocol packet; optionally decrypt, using the session key, the data to generate plaintext data; and store the plaintext data in NVM storage elements of the NVM device.

13 Claims, 10 Drawing Sheets

(56) References Cited

U.S. PATENT DOCUMENTS

| | | | | |
|---|---|---|---|---|
| 9,348,771 | B1* | 5/2016 | Desai | G10H 7/002 |
| 9,760,729 | B2 | 9/2017 | Baentsch et al. | |
| 9,811,478 | B2 | 11/2017 | Kamath et al. | |
| 9,838,201 | B2 | 12/2017 | Cotta | |
| 10,187,800 | B2 | 1/2019 | Cotta | |
| 10,482,036 | B2* | 11/2019 | Admon | G06F 21/606 |
| 10,565,380 | B2* | 2/2020 | Polak | H04L 63/123 |
| 10,757,087 | B2* | 8/2020 | Tasher | G06F 3/0679 |
| 10,809,944 | B1* | 10/2020 | Ostrikov | H04L 9/3236 |
| 10,951,403 | B2* | 3/2021 | Kaluzhny | H04L 9/0891 |
| 2002/0162009 | A1* | 10/2002 | Shmueli | G06Q 30/06 726/15 |
| 2003/0072451 | A1 | 4/2003 | Pimentel et al. | |
| 2005/0108571 | A1* | 5/2005 | Lu | H04L 63/0853 726/4 |
| 2014/0215111 | A1* | 7/2014 | Zitlaw | G06F 13/4243 710/105 |
| 2015/0324304 | A1* | 11/2015 | Baryudin | G06F 21/44 726/17 |
| 2017/0177873 | A1* | 6/2017 | Raghuram | G06F 21/575 |
| 2017/0222815 | A1* | 8/2017 | Meriac | G06F 21/554 |
| 2017/0310652 | A1* | 10/2017 | Campagna | H04L 9/321 |
| 2018/0060589 | A1* | 3/2018 | Polak | H04L 63/123 |
| 2018/0060607 | A1* | 3/2018 | Tasher | G06F 21/602 |
| 2018/0089435 | A1* | 3/2018 | Zander | G06F 21/575 |
| 2018/0145991 | A1* | 5/2018 | McCauley | G06F 8/65 |
| 2018/0285295 | A1 | 10/2018 | Abel et al. | |
| 2018/0302228 | A1* | 10/2018 | Hergesheimer | H04W 4/44 |
| 2019/0207917 | A1* | 7/2019 | Tasher | H04L 63/0876 |
| 2019/0230503 | A1* | 7/2019 | Circosta | H04W 12/003 |
| 2019/0294765 | A1* | 9/2019 | Fine | H04L 63/0281 |
| 2019/0363888 | A1* | 11/2019 | Brostrom | H04L 9/3234 |
| 2020/0302063 | A1* | 9/2020 | Kim | H04L 9/3247 |
| 2020/0412521 | A1* | 12/2020 | Shi | H04L 9/3236 |

FOREIGN PATENT DOCUMENTS

| | | |
|---|---|---|
| WO | 2009137946 A1 | 11/2009 |
| WO | 2019006640 A1 | 1/2019 |

OTHER PUBLICATIONS

DigiKey, "How to Secure IoT Device Communications with a Single Chip", Digi-Key Electronics, Oct. 11, 2017, https://www.digikey.com/en/articles/how-to-secure-iot-device-communications-with-a-single-chip, p. 1-8. (Year: 2017).*

DigiKey, "Add Firmware Security to an IoT Design with a Single Chip", Digi-Key Electronics, Jan. 3, 2017, https://www.digikey.com/en/articles/add-firmware-security-to-an-iot-design-with-a-single-chip, p. 1-14. (Year: 2018).*

Stephane Di Vito, "Protect TLS in IoT Devices with Secure Companion ICs", ElectronicDesign.com, https://www.electronicdesign.com/industrial-automation/article/21805059/protect-tls-in-iot-devices-with-secure-companion-ics, May 16, 2017, p. 1-38. (Year: 2017).*

Stephane Di Vito, "Using Secure Companion ICS To Protect A TLS Implementation", Application Note 6436, Nov. 1, 2017, https://www.maximintegrated.com/en/design/technical-documents/app-notes/6/6436.html, p. 1-14. (Year: 2017).*

Maxim Integrated, "Deepcover Embedded Security—Solution Guide", Maxim Integrated, Jun. 2017, p. 1-10. (Year: 2017).*

Scott Jones et al., "The Fundamentals of Secure Boot and Secure Download: How to Protect Firmware and Data Within Embedded Devices", Maxim Integrated, May 19, 2017, p. 1-11. (Year: 2017).*

Embedded Staff, "Physically securing critical data with non-imprinting memory and hardware AES", Oct. 24, 2012, Embedded, https://www.embedded.com/physically-securing-critical-data-with-non-imprinting-memory-and-hardware-aes/, accessed Apr. 22, 2021, p. 1-9. (Year: 2012).*

Transport Layer Security (TLS) User's Guide, Microchip Technology Inc., ATWINC15x0, 2017, 14 pages.

International Search Report for International Application No. PCT/US19/36100 dated Aug. 30, 2019, 2 pages.

Written Opinion of the International Searching Authority for International Application No. PCT/US19/36100 dated Aug. 30, 2019, 8 pages.

* cited by examiner

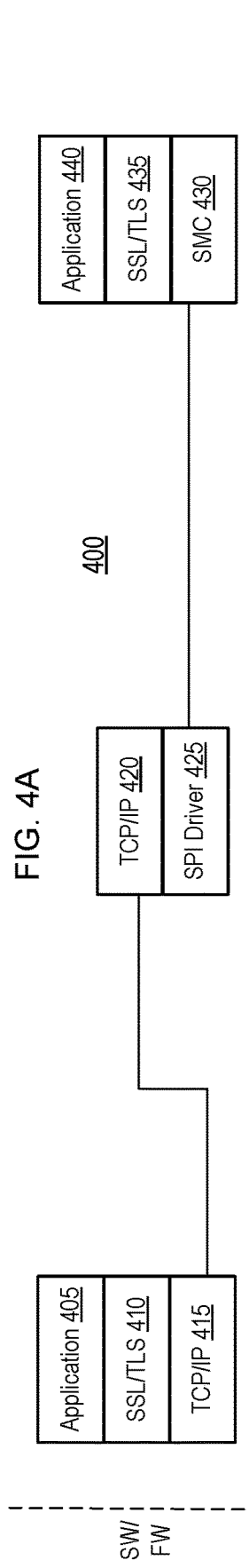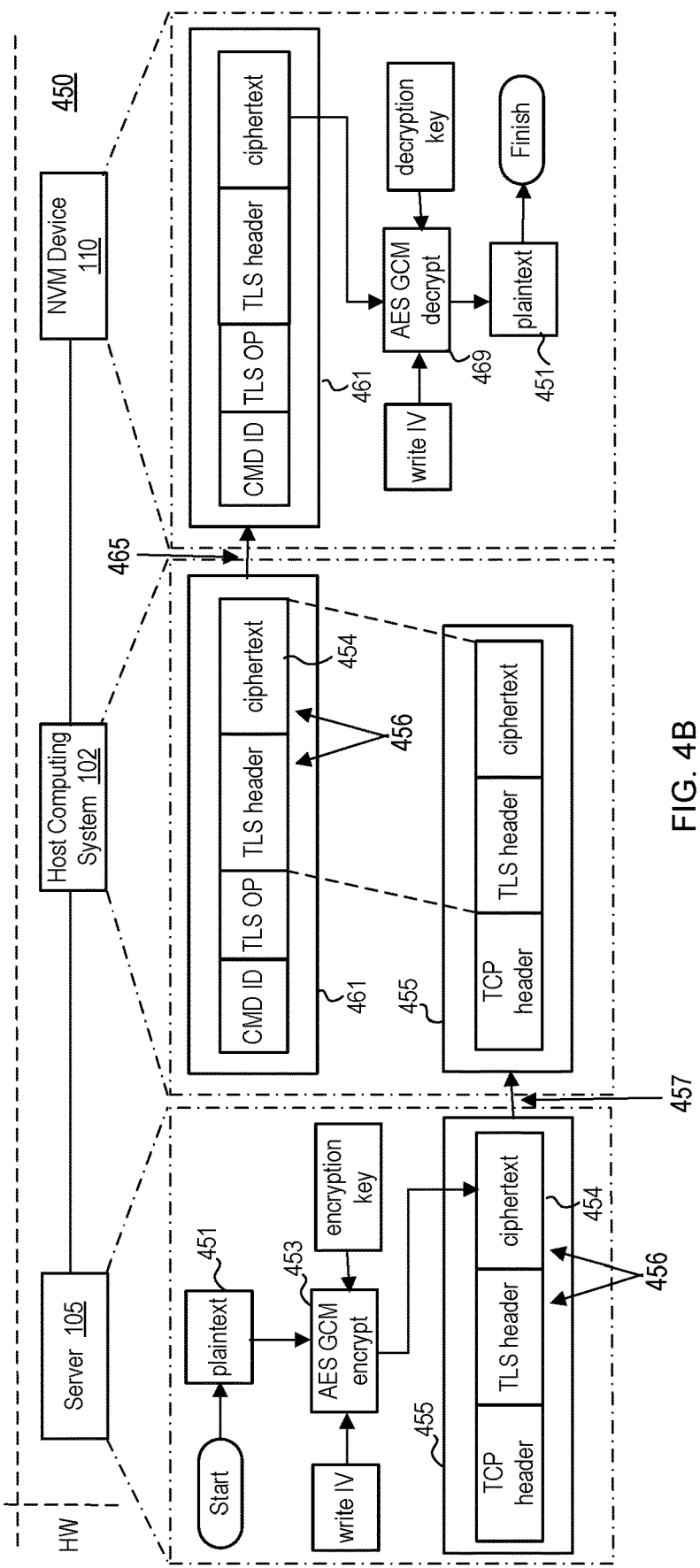
FIG. 4A
FIG. 4B

SECURED COMMUNICATION FROM WITHIN NON-VOLATILE MEMORY DEVICE

RELATED APPLICATIONS

This application claims the benefit of priority to U.S. Provisional Patent Application No. 62/687,146, filed Jun. 19, 2018, which is herein incorporated by these references in its entirety.

TECHNICAL FIELD

The disclosure relates to the field of memory devices, and in particular, to securing communication from within a non-volatile memory device.

BACKGROUND

Internet-of-things (IoT) devices include a host computing system or device coupled to an external non-volatile memory (NVM) device, such as a flash memory device, although other devices may be used such as ferroelectric RAM (FRAM), magneto-resistive RAM (MRAM), and the like. Applications running on the host computing system download applications or boot code into the NVM device, creating security risks without the ability to authenticate the source of the code or to ensure that the code has not been modified in transit to being written to the NVM.

In some embodiments, ensuring the authentication and safe origin of the code is performed via a secure protocol transaction with the host computing system. The memory controller units of many smaller sized IoT devices, however, cannot protect keys and thus compromise the secure protocol transaction. Furthermore, plaintext data written from the host computing system to the external NVM device is unprotected, allowing it to be read out and/or modified by an attacker. Even if encrypted data is instead written to the NVM of the NMV device, the data has to be decrypted in the host computing system, therefore opening up the IoT device to replay attacks and increasing the attack surface, e.g., on both the host computing system and the NVM device.

BRIEF DESCRIPTION OF THE DRAWINGS

The disclosure is illustrated by way of example, and not of limitation, in the figures of the accompanying drawings.

FIG. 4A is a block diagram of the software and firmware of the major components of the system of FIGS. 1A-1B according to an embodiment.

FIG. 4B is a block diagram of the hardware of those major system components of FIGS. 1A-1B, illustrating a method for secure protocol communication between the server and NVM device according to an embodiment.

DETAILED DESCRIPTION

Figure 1A:
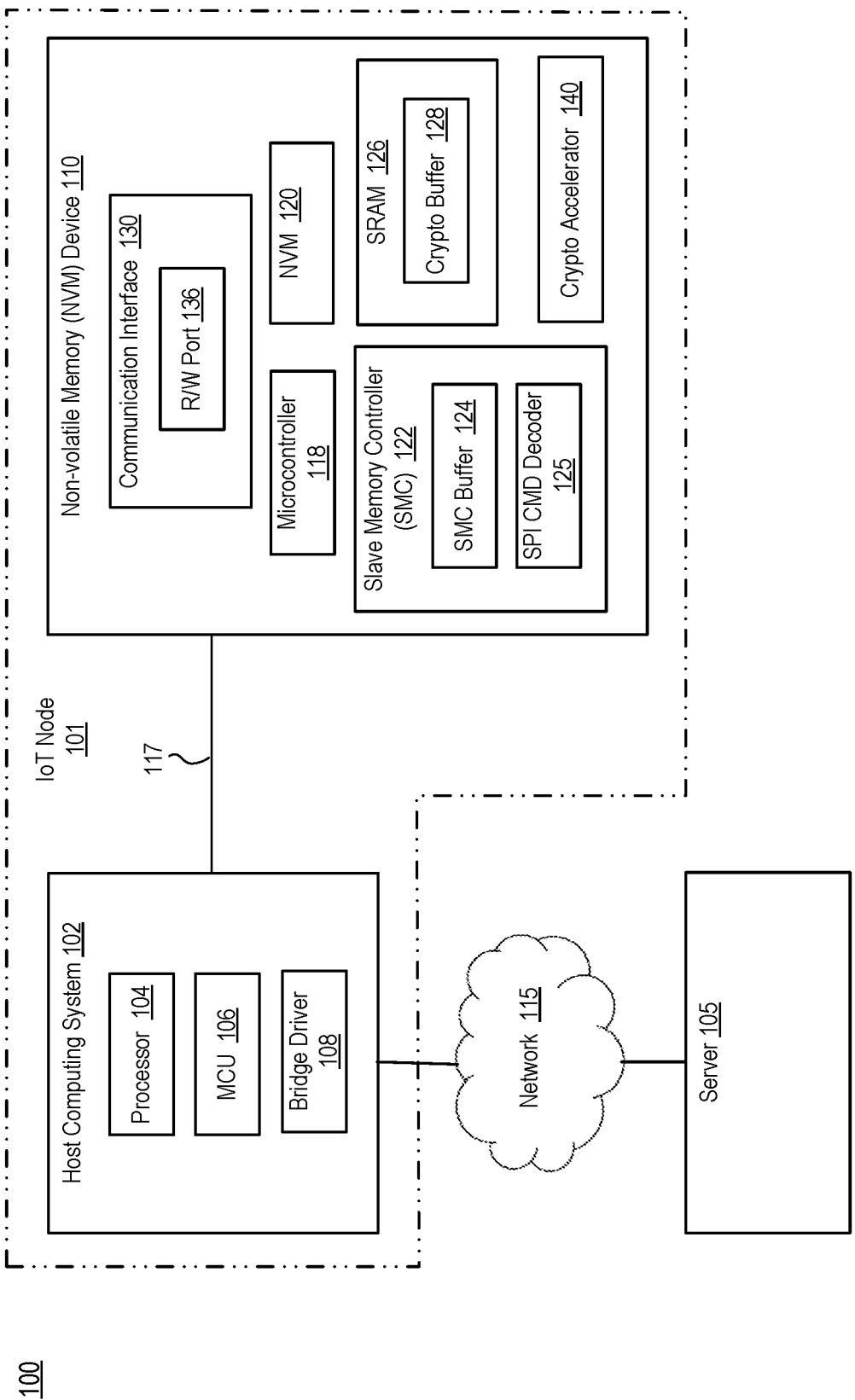
FIG. 1A is a block diagram of a system of an internet-of-things (IoT) node that includes an external non-volatile memory (NVM) device according to various embodiments.

To resolve the above deficiencies in securing data communication between a server and a NVM device of an IoT device (and thus closing down the attack surfaces of the NMV device and a coupled host computing system), a secure protocol communication session may be established directly between the server and the NVM device. The secure protocol may be, for example, one of secure sockets layer (SSL) protocol or transport layer security (TLS) protocol. This allows the NVM device to directly authenticate the server, e.g., only accepts updates from a trusted server. This solution further enables the NVM device to authenticate itself to the server, as secure protocols facilitate mutual authentication. This means that the server can verify that data received from the NVM device has not been tampered with in transit. This solution also removes the host computing system as an integral part of the secure protocol communication session.

Instead, as will be explained in detail in various embodiments, the host computing system repackages transport control protocol (TCP) packets from the server into serial peripheral interface (SPI) packets recognizable by the NVM device, but that still include a secure protocol packet that was originally encapsulated within the TCP packet. The host computing system may exchange SPI packets with the NVM device to facilitate secure protocol handshake and data transfer. In embodiments, the firmware and application programming interfaces (APIs) of the NVM device may be updated to interface with a crypto buffer (of a static random access memory (SRAM)) and a cryptographic accelerator (both located on the NVM device) in carrying out aspects of a secure handshake and establishing secure data transfer with the server using the secure protocol.

In various embodiments, the host computing system likewise receives SPI packets from the NVM device and encapsulates the SPI packets into individual TCP packets to be transmitted to the server. In dealing with the secure protocol packet, the host computing system cannot decrypt the encrypted data from the NVM device or the server, as it does not have access to the decryption key (e.g., one of the session keys). Further, the host computing system does not contribute in a meaningful way (other than as communication intermediary) to the secure protocol authentication that now takes place directly between the server and the NVM device.

In one embodiment, an apparatus includes a non-volatile memory (NVM) device, which itself includes a processing device, coupled to a host computing system. The NVM device is to receive a communication packet from a server via the host computing system that is coupled to the NVM device and communicatively coupled to the server. The communication packet includes clear text data with a request to initiate secure communications. The NVM device is further to perform a secure handshake with the server, via communication through the host computing system, using a secure protocol that generates a session key (e.g., a decryption key of a pair of session keys). The NVM device is further to receive data, via the host computing system, from the server within a secure protocol packet. The NVM device may further authenticate the data using at least the secure protocol metadata retrieved from the secure protocol packet. The NVM device may also decrypt, using the session key, the data (if encrypted) to generate plaintext data, and store the plaintext data in NVM storage elements of the NVM device.

In embodiments, the host computing system is unable to decrypt the data (if encrypted), e.g., because it does not have the proper session key (e.g., decryption key) as the secure protocol session was initiated directly between the server and the NVM device. The host computing system is also unable to authenticate the data because it does not have access to secure protocol metadata of the secure protocol packet and is unaware of the cipher suite being used for authentication between the NVM device and the server.

In another embodiment, a system includes a NVM device that attempts to connect to a server via a host computing system and the host computing system in networked communication with the server and with the NVM device. In embodiments, the host computing system is to transmit a communication packet from the server to the NVM device, the communication packet including clear text data with a request to initiate secure communications with the NVM device. The host computing system may further facilitate performance of a secure handshake between the NVM device and the server, the secure handshake using a secure protocol to initiate the secure communications in which the NVM device generates a first session key that is inaccessible to the host computing system. The host computing system may further receive, from the server, a transport control protocol (TCP) packet that includes a secure protocol packet. The secure protocol packet includes encrypted data, which the server encrypted with a second session key (e.g., the encryption key of a pair of session keys generated by the server). The host computing system may further remove a TCP header of the TCP packet to expose the secure protocol packet. The host computing system may further generate a serial peripheral interface (SPI) packet via appending a SPI crypto-write command and a secure protocol operation identifier to the secure protocol packet. The host computing system may then transmit the SPI packet to the NVM device.

In this way, establishing and using a secure communication session between a source (like a server) and the NVM device may offer a number of advantages over a non-secure host computing system. These advantages include the capability of authenticating a source of download or uploads, ensuring the confidentiality of downloaded or uploaded data, and ensuring integrity and authenticity of downloaded and uploaded data.

In embodiments, establishing and using a secure communication session between a source (like a server) and the NVM device may offer a number of advantages over even use of a secure host computing system. These advantages include that the secure connection has a smaller attack surface, in removing the host computing system as a possible layer of attack. More specifically, the plaintext data that is being communicated as ciphertext data to the NVM device is not decrypted at any point along the communication pathway, but only once arriving and being buffered into a secure cryptographic buffer of the NVM device as will be explained in more detail. Furthermore, implementing a secure solution that coexists with non-secure user applications of the host computing system is non-trivial. A secure protocol connection direct between the server and NVM memory simplifies (and possibly eliminates) the need to implement a secure solution for such non-secure user applications.

FIG. 1A is a block diagram of a system 100 of an internet-of-things (IoT) node 101 that includes an external non-volatile memory (NVM) device according to various embodiments. The IoT node 101 is also referred to as an edge device in some contexts. The system 100 be connected to (or through) a network 115, which is also referred to as the cloud and may generally be understood to be one or more backbone connection through the internet. The system 100 may further include a server 105 to which the IoT node 101 is to connect over the network 115 in order to receive firmware updates, to provide sensor data or other intelligence, and the like. The server 105 is understood to generally communicate via transport control protocol (TCP) internet protocol (IP), e.g., via TCP/IP.

In various embodiments, the IoT node 101 may be instantiated as a multi-chip module or a semiconductor package and includes a host computing system 102 coupled to a non-volatile memory (NVM) device 110. The NVM device 110 may be a flash device, a solid-state-storage device, a ferroelectric RAM (FRAM), a magneto-resistive RAM (MRAM), or other non-volatile memory device.

In embodiment, the host computing system 102 includes, among other components, a processor 104, a memory controller unit 106 (e.g., a master MCU), and a bridge driver 108. As will be explained in more detail, the host computing system 102 may be coupled to the NVM device 110 via a bus 117 such as a serial peripheral interface (SPI) bus, an inter-integrated circuit (I2C) bus, or other type of bus transfer protocol, for example. The bridge driver 108 may be adapted to convert transmission control packets (TCP) to SPI packets and vice versa to facilitate communication between the server 105 and the NVM device 110 as will be explained in more detail.

In embodiments, the NVM device 110 includes a communication interface 130, a microcontroller 118 (e.g., processing device of the NVM device 110), NVM storage elements 120 (which may be organized as a storage array of NVM storage cells), a slave memory controller (SMC) 122, static random access memory (SRAM) 126, and a cryptographic ("crypto") accelerator 140. The communication interface 130 may include a read/write port 136. The SMC 122 may include an SMC buffer 124 and an SPI command decoder 125, e.g., which decodes SPI-based commands. Further, the SRAM 126 may include a crypto buffer 128, which is to buffer SPI packets that include cryptographic operations. In embodiments, the SMC 122 receives read and write operations from the MCU 106 of the host computing system 102, and directs completion of the read and write commands with reference to the SRAM 126 and the NVM 120.

Figure 1B:
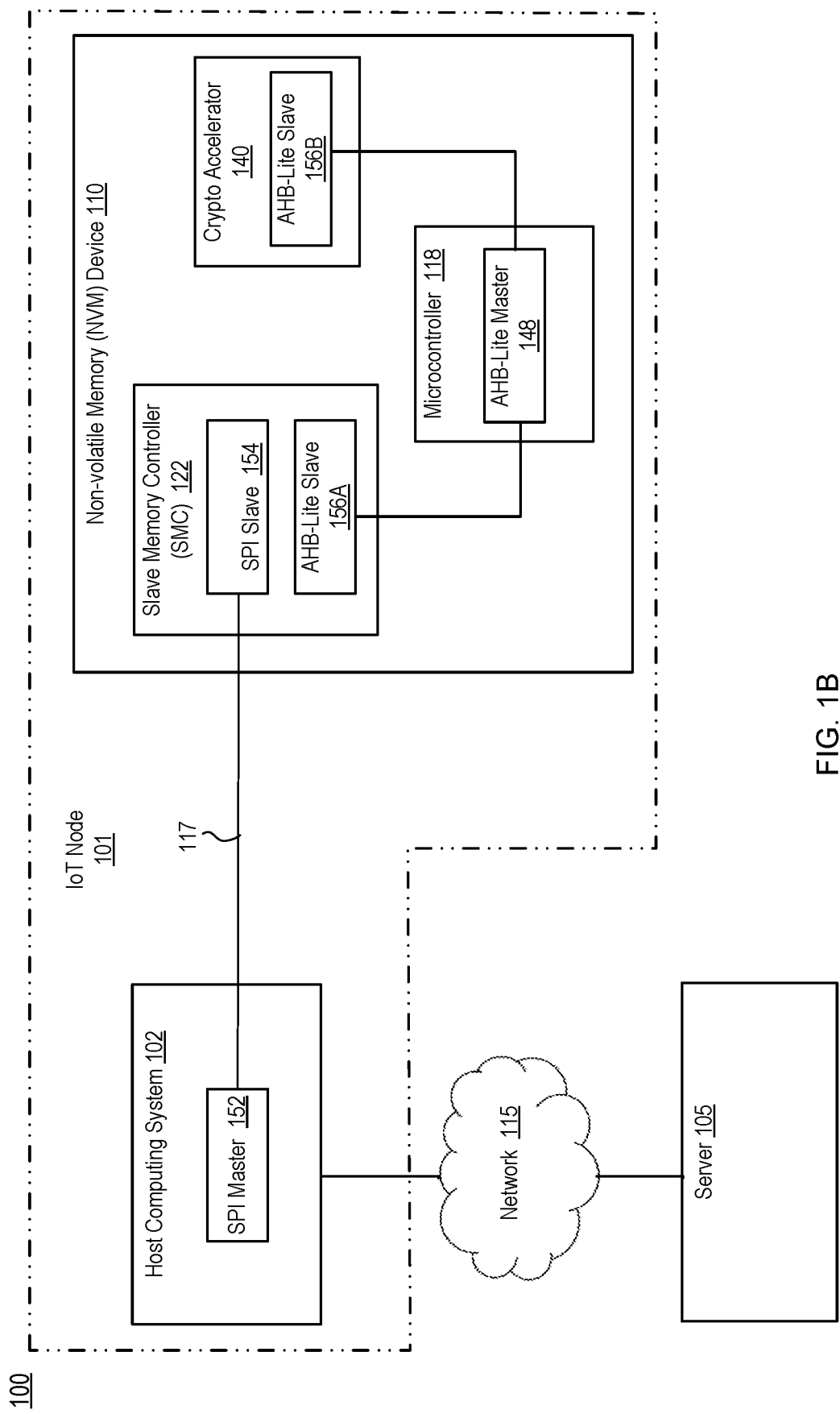
FIG. 1B is a block diagram of the system of FIG. 1A illustrating additional subcomponents according to on embodiment.

FIG. 1B is a block diagram of the system 100 of FIG. 1A illustrating additional subcomponents according to on embodiment. In additional embodiments, the host computing system 102 includes an SPI master 152, e.g., which may be a part of the MCU 106. Further, the SMC 122 of the NVM device 110 further includes a SPI slave 154 to communicate, using SPI packets over the bus 117, in exchange with the SPI master 152. Table 1 illustrates a set of exemplary application programming interfaces (APIs) useable by the SPI master 152 for communication with the SPI slave 154, where "SPI" stands for serial peripheral interface and "TCP" stands for transmission control protocol, e.g., referencing TCP of TCP/IP.

TABLE 1

| API | Function |
|---|---|
| spi_write( ) | Write to SMC buffer 124 |
| spi_read( ) | Read from SMC buffer 124 |
| tcp_to_spi( ) | Split a single TCP packet into N SPI packets |
| spi_to_tcp( ) | Merge N SPI packets into a single TCP packet |

In embodiments, the microcontroller 118 communicates over a system-on-a-chip (SoC) bus architecture such as Advanced High-Performance Bus (AHB)-Lite. Thus, the microcontroller 118 includes an AHB-Lite master 148 in one embodiment. The AHB-Lite protocol is an Advanced Microcontroller Bus Architecture (AMBA) open standard that provides on-chip interconnect specification for the connection and management of functionality blocks in an SoC design. Although AHB-Lite is referenced herein, other microcontroller bus architectures are envisioned.

In corresponding embodiments, the SMC 122 and the crypto accelerator 140 each includes an AHB-Lite slave 156A and 156B, respectively, with which the AHB-Lite master 148 can communicate. The microcontroller 118 may work in conjunction with the crypto accelerator 140 to perform the cryptographic operations that make possible the initiation of a secure communication session with the server 105, and to exchange encrypted data with the server 105 during data transfer as will be discussed in more detail. In one embodiment, the crypto accelerator 140 is a field programmable gate array (FPGA) device programmed with mxcrypto, which an extensive toolkit including Python extensions for encryption, authentication, key exchange, secure socket operation, transport layer security operation, and other types of cryptographic operations. Other types of cryptographic toolkits are envisioned.

In one embodiment, Table 2 illustrates exemplary APIs used by the AHB-master 148 of the microcontroller 118 to communicate with the AHB-Lite slave 156A of the SMC 122. In on embodiment, Table 3 illustrates exemplary APIs used by the AHB master 148 of the microcontroller 118 to communicate with the AHB-Lite slave 156B of the crypto accelerator 140.

TABLE 2

| API | Function |
|---|---|
| smc_to_sram( ) | Transfer data from SMC buffer to SRAM |
| sram_to_smc( ) | Transfer data from SRAM to SMC buffer |

TABLE 3

| API | Function |
|---|---|
| mxcrypto_verify_signature( ) | Use mxcrypto capabilities to verify signature |
| mxcrypto_sign( ) | Use mxcrypto capabilities to sign data |
| mxcrypto_calculate_ec_point( ) | Use mxcrypto to calculate elliptic curve point |
| mxcrypto_sha256( ) | Calculate SHA256 digest |
| decrypto_and_verify_hmac( ) | decrypt data, then check its HMAC value |

Figure 2A:
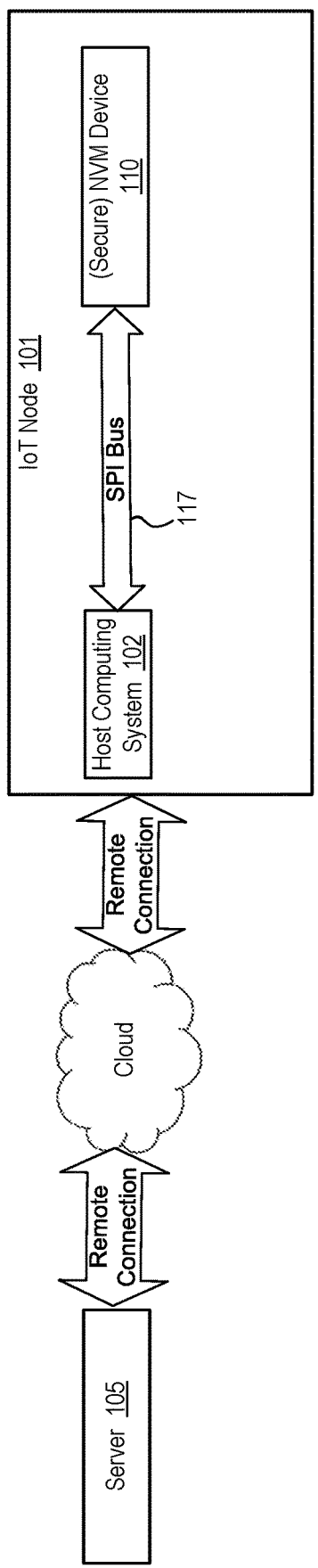
FIG. 2A is a block diagram of the system of FIG. 1A that illustrates remote connections and a serial peripheral interface (SPI) bus within the IoT node according to an embodiment.

FIG. 2A is a block diagram of the system 100 of FIG. 1A that illustrates remote connections and the SPI bus 117 within the IoT node 101 according to an embodiment. In embodiments, the server 105 is communicatively coupled to the IoT node 101 over a pair of remote connections to the cloud, e.g., the network 115. The IoT node 101 may include the host computing system 102 and the NVM device 110 that are coupled by the SPI bus 117.

Figure 2B:
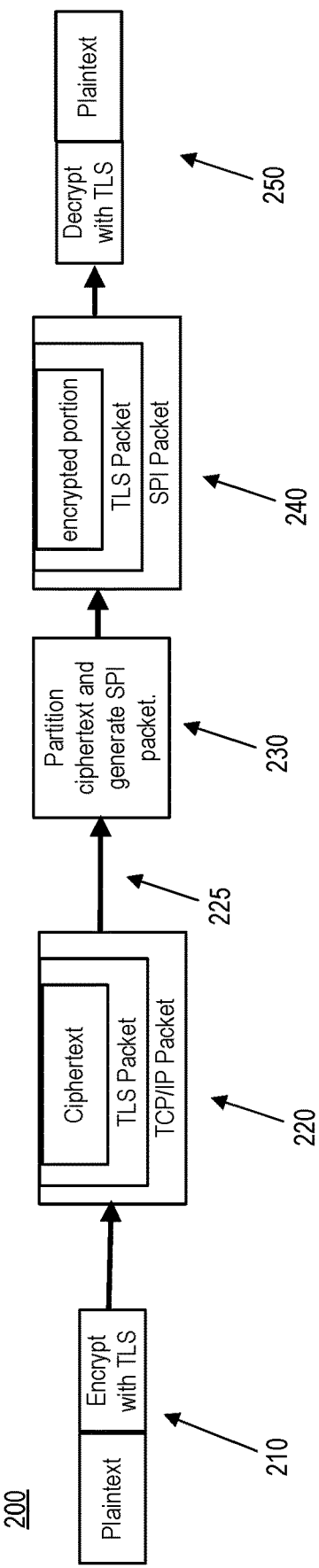
FIG. 2B is a simplified data flow diagram that corresponds to the hardware illustrated in FIG. 2A according to an embodiment.

FIG. 2B is a simplified data flow diagram 200 that corresponds to the hardware illustrated in FIG. 2A according to an embodiment. In embodiments, the data flow diagram 200 illustrates data flow that starts with plaintext data stored at the server 105. The server 105 may encrypt the plaintext data with TLS (or other secure internet protocol or related cryptographic algorithm) to generate ciphertext data (210). The server 105 may also package the ciphertext data within a TLS packet and send the TLS packet within a TCP/IP packet (220).

In embodiments, the IoT node 101 (e.g., the host computing system 102) receives the TCP/IP packet (225). The bridge driver 108 of the host computing system 102 may then partition the ciphertext data into portions of encrypted data to generate an SPI packet from each portion of the encrypted data (230). In embodiments, the SPI bus 117 passes the SPI packets to the NVM device 110 (240). Each SPI packet may include the TLS packet with the encrypted portion (240). The NVM device 110, e.g., via use of the crypto accelerator 140 may then decrypt the encrypted portion to again generate the plaintext data (250). At the same time or in conjunction with the decryption, the NVM device 110 may further authenticate the data a line (or row) at a time as it is decrypted and before being programmed to the NVM 120. The steps of this simplified data flow diagram 200 are explained in more detail with reference to FIG. 4, with exemplary implementation.

Figure 3:
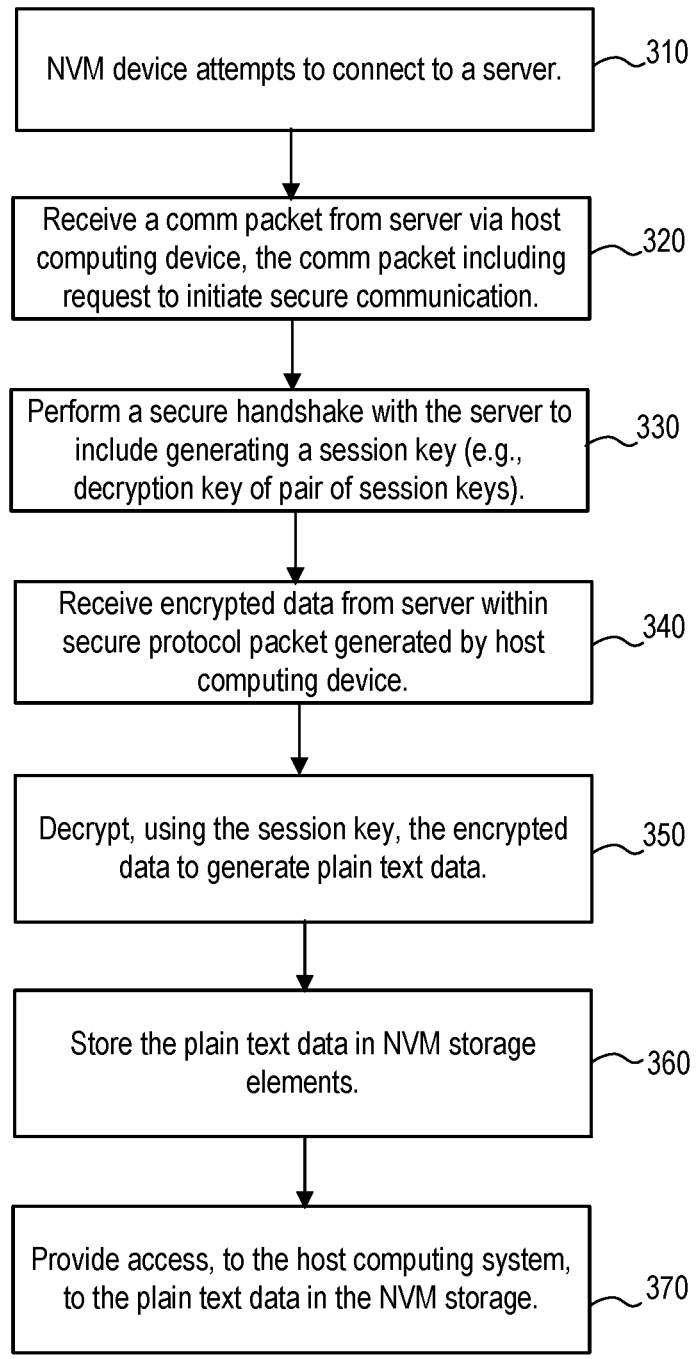
FIG. 3 is a flow diagram of a method for initiating a secure communication session and exchanging encrypted data between a server and a secure NVM device according to an embodiment.

FIG. 3 is a flow diagram of a method 300 for initiating a secure communication session and exchanging encrypted data between a server and a secure NVM device according to an embodiment. The method 300 may be performed by processing logic that may comprise hardware (e.g., circuitry, dedicated logic, programmable logic, microcode, etc.), software (such as instructions run on a processing device), firmware, or a combination thereof. In one embodiment, the method 300 is performed by various components of the NVM device 110.

With reference to FIG. 3, the method 300 may begin with the processing logic initiating a connection to the server 105 via the host computing system 102 (310). In response to the attempt, the method 300 may continue with the processing logic receiving a communication packet from the server 105 via the host computing system 102 that is communicatively coupled to the server (320). The communication packet may include a request to initiate secure communications. The method 300 may continue with the processing logic performing a secure handshake with the server 105, via communication through the host computing system 102, using a secure protocol that generates a session key (e.g., a decryption key of a pair of session keys) (330). In embodiments, the secure handshake is performed via transmission of data within SPI packets between the SPI slave 154 (of the SMC 122) and the SPI master 152 (of the host computing system 102).

With continued reference to FIG. 3, the method 300 may continue with the processing logic receiving encrypted data, via the host computing system 102, from the server 105 within a secure protocol packet (340). The host computing system 102 is unable to decrypt the encrypted data. The method 300 may continue with the processing logic decrypting, using the session key, the encrypted data to generate plaintext data (350). The method 300 may continue with the processing logic storing the plaintext data in NVM storage elements of the NVM device (360). The method 300 may continue with the processing logic providing access, to the host computing system 102, to the plain text data stored in the NVM storage elements (370).

FIG. 4A is a block diagram of the software and firmware (SW/FW) 400 of the major components of the system 100 of FIGS. 1A-1B according to an embodiment. The SW/FW 400, for example, may include an application 405 (such as a firmware update producer), SSL or TLS stack 410, and TCP/IP stack 415, all which may run on the server 105. The SW/FW 400 may further include TCP/IP stack 420 and an SPI driver 425 that run on the host computing system 102. The SPI driver 425 may be the same as or integrated within the bridge driver 108 of the host computing system 102. The SW/FW 400 may further include SMC firmware 430, SSL/TLS stack 435, and an application 440 (e.g., a firmware update consumer) that run on the NVM device 110.

FIG. 4B is a block diagram of the hardware of those major system components of FIGS. 1A-1B, and illustrating a method 450 for secure protocol communication between the server 105 and the NVM device 110, using the host computing system 102 as an intermediary according to an embodiment. In one embodiment, the host computing system is a Zynq-7000 FPGA and the NVM device is a Kintex-7 FPGA.

The method 450 may begin with the server 105, e.g., within a SSL/TLS session, encrypting plaintext data 451 into ciphertext data 454 (also referred to as encrypted data) using an encryption algorithm 453 (e.g., with Advanced Encryption Standard (AES) in Galois/Counter Mode (GCM), which also authenticates data) taking as inputs a write initialization vector (IV) and an encryption key. The encryption key may be one of the session keys generated during a handshake process with the NVM device 110 as will be explained in more detail. The method 450 may continue with the server 105 encapsulating the ciphertext data 454 into a TCP packet 455 having a TCP header. The encapsulation of the ciphertext data 454 includes a TLS (or other secure protocol) header, together which may be referred to as a secure protocol packet 456. The TLS header may include certain TLS-based (or other secure protocol) metadata used to transport and that is specific to the TLS-based communication session.

The method 450 may continue with the server 105 transmitting 457 the TCP packet 455 to the host computing system 102. The host computing system 102 may therefore receive, from the server 105, the TCP packet 455 that includes the secure protocol packet 456. As discussed, the secure protocol packet 456 may include the ciphertext data 454 (e.g., encrypted data) and the TLS header. The host computing system 102 may further remove the TCP header of the TCP packet 455 to expose the secure protocol packet 456. The method 450 may continue with the host computing system 102 generating a serial peripheral interface (SPI) packet 461 via appending a SPI crypto-write command (CMD ID) and a secure protocol operation identifier (e.g., TLS OP) to the secure protocol packet and transmitting 465 the SPI packet 461 to the NVM device 110. While a crypto read command may be similarly transmitted, the crypto read command would not be accompanied by the ciphertext data.

The method 450 may continue with the NVM device 110 receiving the SPI packet 461 from the host computing system 102. The method 450 may continue with the NVM device, among other things, as will be discussed in detail with reference to FIG. 5, decrypting 469 the ciphertext data 454 using a decryption algorithm (e.g., the AES GCM algorithm discussed previously) using as inputs the write initialization vector and a decryption key. The decryption key may be a session key generated during the secure handshake between the server 105 and the NVM device 110. The decrypting may generate the plaintext data 451 that was originally encrypted by the server 105.

In this way, the host computing system 102 converts the TCP packet 455 to an SPI packet 461, via swapping and/or removing out certain parts of their headers, where the SPI packet 461 may then be transmitted over the SPI bus 117 to, and is readable by, the NVM device 110. In doing so, the host computing system 102 does not read the ciphertext data 454, but passes it along to the NVM device 110. If an attacker even attempted access of the ciphertext data 454 at the host computing system 102, the data would be meaningless without the decryption key. The decryption key, however, is not stored at the host computing system 102 and is inaccessible to the host computing system 102 in being stored in the crypto buffer 128 of the SRAM 126 of the NVM device 110. This eliminates the attack surface at the host computing system and greatly enhances secure direct communication between the server 105 and the NVM device 110.

Figure 5:
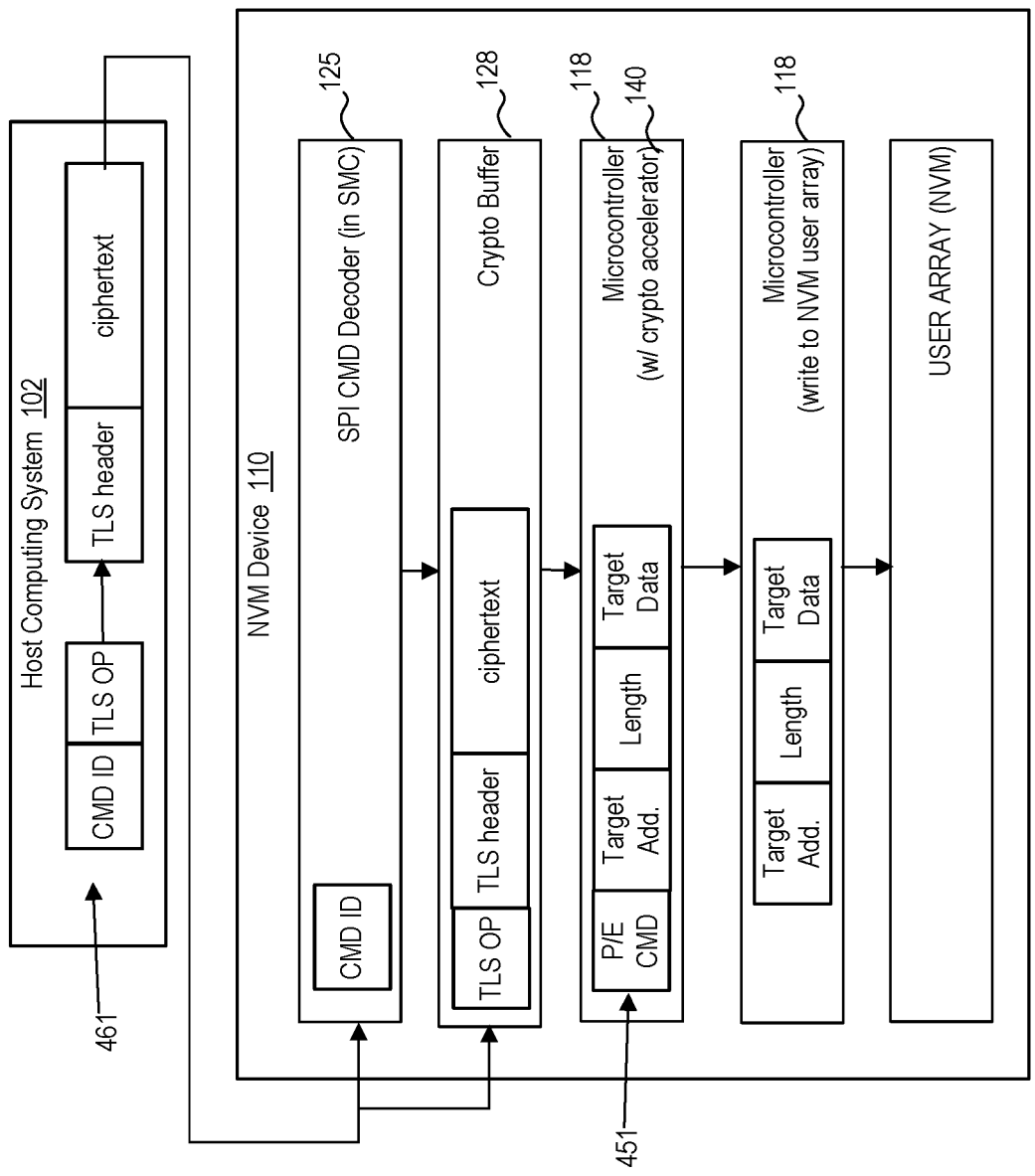
FIG. 5 is a block diagram illustrating steps taken by the host computing system and the NVM device of an IoT device to execute a secured write command on the NVM device that was initiated by the server according to an embodiment.

FIG. 5 is a block diagram illustrating steps taken by the host computing system 102 and the NVM device 110 (of the IoT device 101) to execute a secured write command on the NVM device 110 that was initiated by the server 105 according to an embodiment. As discussed with reference to FIG. 4B, the host computing system 102 may generate the SPI packet 461 by appending a crypto-write command, which is identified with a command identifier (CMD ID), and a secure protocol operation identifier (e.g., the TLD OP) to the secure protocol packet 456 (FIG. 4B).

In various embodiments, a SPI command decoder 125 in the SMC 122 of the NVM device 110 may detect the crypto-write command (CMD ID) within the SPI packet. In response to detecting the cryptographic memory operation identified by the CMD ID (which could also be a crypto read command in other cases), the SMC 122 may buffer the SPI packet (minus the CMD ID) into the crypto buffer 128. The microcontroller 118 may then parse the SPI packet to retrieve encrypted data (e.g., ciphertext data), and retrieve the secure protocol operation identifier (TLS OP) and the secure protocol (or SPI) metadata from the TLS header. The microcontroller 118 may transfer portions of the SPI packet from the crypto buffer to the SRAM. At this point, the microcontroller 118 may direct execution of the secure protocol (e.g., TLS in this example) to complete the secure write operation. The execution of the secure protocol may include processing the portions of the SPI packet out of the SRAM according to the secure protocol, to include verification of the secure protocol metadata.

More specifically, the microcontroller 118 may direct the cryptographic accelerator 140 to decrypt the ciphertext data to generate the plaintext data 451 (FIG. 4B) within the secure protocol packet that the server 105 originally encrypted. The data within the secure protocol packet may include a program erase (P/E) command (e.g., for writing to a solid-state-storage device) or other specific type of write command, a target address (e.g., in the user array of the NVM 120), a length of the target data, and the target data itself (all illustrated). The program erase or P/E command may direct the erasure of the entire user array of NVM storage elements (e.g., where the NVM 120 is EEPROM) or select blocks of NVM storage elements (e.g., where the NVM 120 is flash memory). In some embodiments, no P/E command is received, and therefore, an erasure command is implied and sufficient portions of the NVM 120 are erased such as to accommodate the data to be written to the NVM 120. The microcontroller 118 may then program the user array or the portion of the user array (e.g., the NVM storage elements at the target address) with the target data using the target address and the length information from the decrypted SPI packet. If this were a secure read command, there would be no target data, and the microcontroller would perform a secure read at a target address of data of a certain length.

Figure 6:
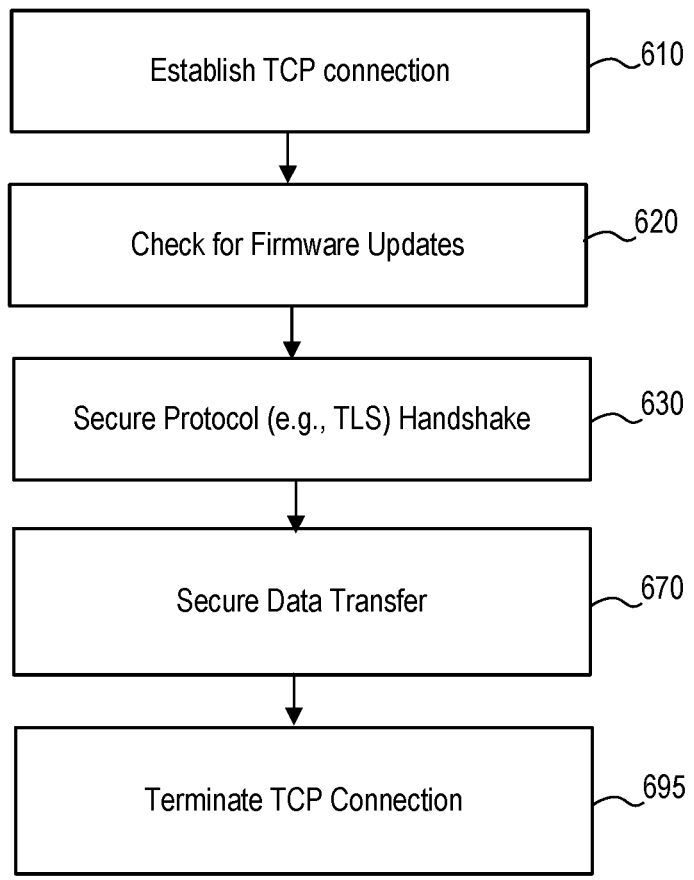
FIG. 6 is a flow chart of a method of establishing a secure protocol communication session for purposes of establishing secure communication between the server and a secure NVM device according to an embodiment.

FIG. 6 is a flow chart of a method 600 of establishing a secure protocol communication session for purposes of establishing secure communication between the server and a secure NVM device according to an embodiment. The method 600 may be performed by processing logic that may comprise hardware (e.g., circuitry, dedicated logic, programmable logic, microcode, etc.), software (such as instructions run on a processing device), firmware, or a combination thereof. In one embodiment, the method 600 is performed by various components of the NVM device 110 in communication with the server 105.

With reference to FIG. 6, the method 600 may begin with the processing logic establishing a TCP connection between the NVM device 110 and the server 105 (610). The method 600 may continue with the processing logic checking for firmware updates from the server 105, although there may be other reasons for the NVM device 110 to communicate with the server (620). The method 600 may continue with the processing logic performing a secure protocol handshake, such as which occurs to initiate an SSL or TLS session using HTML code (630). The secure handshake may include a series of sequencing operations that lead to a series of cryptographic operations, which generate one or more session key (e.g., at least one session key for the NVM device and the same session key for the server). The method 600 may continue with the processing logic performing a secure data transfer (or exchange) with the server 105 (670). The method 600 may continue with the processing logic terminating the TCP connection (695).

Figure 6A:
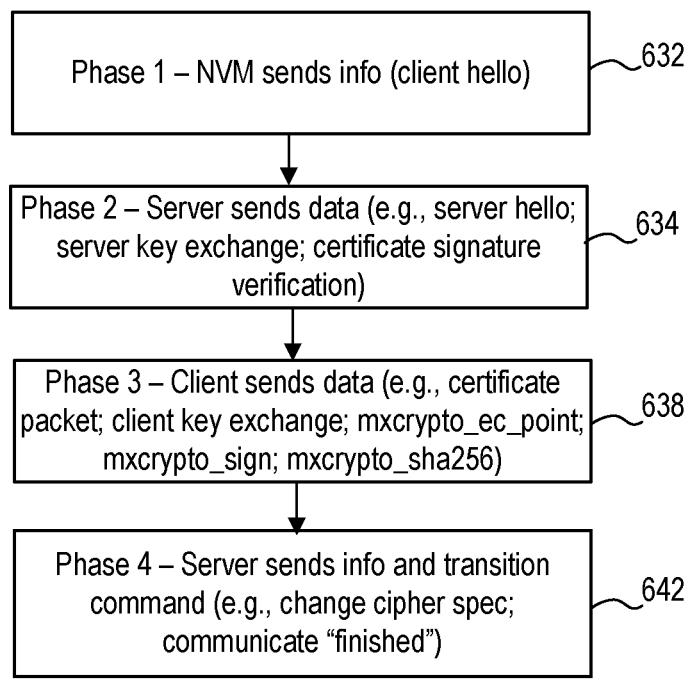
FIG. 6A is a flow chart of the secure protocol handshake, e.g., for a firmware over the air update (FOTA), between the server and the NVM device according to an embodiment.

FIG. 6A is a flow chart of the secure protocol handshake 630, e.g., for a firmware over the air update (FOTA), between the server and the NVM device, which is also referred to as the client device, according to an embodiment. The secure protocol handshake 630 may be performed in a number of phases and include different cryptographic and/or secure protocol transactions to carry out the initiation of a secure protocol communication session. These transactions may change depending on the protocol and on the version of that protocol that is being used. Accordingly, a general framework is discussed and the communication mechanism are explained. In explaining, reference is made back to the API's listed in Tables 1-3, and other possible API's are suggested, and is reference to the general communication flow described with reference to FIG. 1B.

In various embodiments, Phase 1 moves forward in response to a reply from the server 105 that an update is required, and include sending a "hello" message to the server 105 (632). This client hello message is to inform the server what functionality the NVM device can support, e.g., a list of cipher suites. A cipher suite is a combination of cryptographic primitives usable for authentication and encryption/decryption. Phase 1 may involve the microcontroller 118 generating a tls_create_packet("client hello"), which is sent to the SMC 122. The SMC 122 may then generates a spi_read("client hello") message that is sent to the host computing system 102. The host computing system 102 may then convert the spi_read("client hello") message to a tcp_write("client hello") message that is sent to the server 105.

In various embodiments, Phase 2 proceeds with the server 105 replying to the NVM device 110 with a "hello," may perform a server key exchange, and certificate signature verification (634). This server hello may include a choice from among the list of possible cipher suites received from the NVM device 110, which choice is communicated to the client. Furthermore, for the certificate signature verification, the server 105 may send its certificate in a tcp_write("certificate") message to the host computing system 102. The host computing system 102 may perform a tcp_to_spi( ) conversion to generate a spi_write("certificate"), which is sent to the SMC 122. The SMC 122 may generate a smc_to_sram("certificate"), which is sent to the microcontroller 118, e.g., processing device. The microcontroller 118 may convert the smc_to_sram ("certificate") to a tls_process ("certificate") message, which triggers a mxcrypto_verify_signature("certificate") to the crypto accelerator 140.

In embodiments, a similar series of steps (as just described) may be performed to execute the server key exchange, which is initiated by the server, with or without access of the crypto accelerator 140 at the end of the exchange. The server key exchange may enable exchanging session keys such that the NVM device and the server are using a common set of session keys, e.g., at least an encryption key and a decryption key for the server and another set of encryption and decryption keys for the NVM device 110. A write certificate request may be performed with a similar series of steps, in which the server requests the client's certificate from the NVM device in a "certificate request" message. To complete Phase 2, the server 105 may send a tcp_write ("server hello done") message that is sent and converted until reported to the microcontroller 118. The server hello done message may indicate that the server needs more information to proceed.

In various embodiments, Phase 3 proceeds with certificate packet creation, client key exchange, elliptic curve point shared between the server and the NVM device, a cryptographic signature (e.g., mxcrypto_sign) is applied to handshake messages, and a cryptographic algorithm (e.g., mxcrypto_sha256) is applied to handshake messages (638). In embodiments, the client key exchange is initiated by the microcontroller 118 and completes at the server, e.g., with a conversion of the client certificate from an spi_read("certificate") to a tcp_write("certificate") at the host computing system 102. The microcontroller 118 may then initiate a mxcrypto_sign("handshake messages") with the crypto accelerator 140 to apply a secure protocol signature to the handshake messages.

The microcontroller 118 may then initiate a certificate verification process that moves through the SRAM, to the SMC, to host computing system, and on to the server. The certificate verification may include a signature of previous messages via a "certificate verify" message. The microcontroller 118 may further initiate a change cipher specification ("spec") process that is transmitted to the server 105 via the same series of components and with the same conversion between SPI and TCP packets. This client "change cipher spec" message is to tell the server that the NVM device is ready to use the cipher suite the server has chosen. The microcontroller 118 may further initiate application of a cryptographic algorithm (e.g., mxcrypto_sha256("handshake messages") with the cryptographic accelerator 140, to encrypt TLS messages with an encryption key of the session keys.

In various embodiments, Phase 4 proceeds with the server 105 sending a tcp_write("change cipher spec") to the host computing system 102, which is converted via a tcp_to_spi( ) API to a spi_write("change cipher spec") and sent to the SMC 122. This server "change cipher spec" message allows the serer to confirm to the NVM client device that the server is ready to use the chosen cipher suite. At the NVM device, the SMC may send the command to change cipher specification to the SRAM via the microcontroller 118. The server 105 may then initiate a "finished" message that is sent through the host computing system 102, the SMC, and on to the microcontroller 118 of the NVM device. This "finished" message or command may be to notify the NVM device that ongoing communication will now be secured by the cipher suite that the server selected from those available at the NVM device. This completes the secure protocol handshake. These are some likely steps to such a secure protocol handshake; additional or fewer steps may be performed, as would be apparent to one skilled in the art of secure protocol handshakes.

Figure 6B:
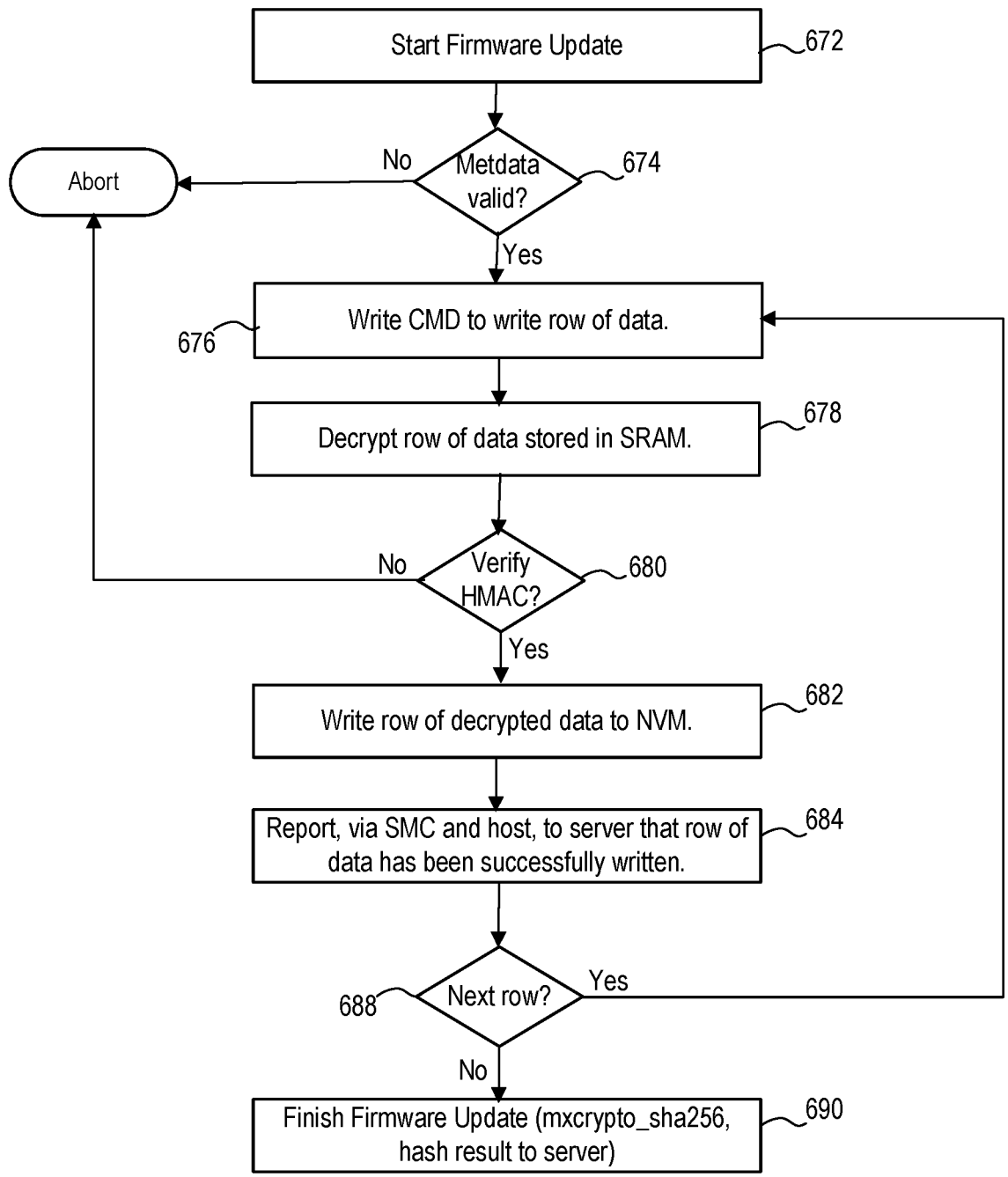
FIG. 6B is a flow chart of secure data transfer, e.g., for the FOTA, between the server and the NVM device according to an embodiment.

FIG. 6B is a flow chart of secure data transfer 670, e.g., for the FOTA, between the server 105 and the NVM device 110 according to an embodiment. The secure data transfer 670 may begin with the server 105 sending a tcp_write ("start firmware update") message to the host computing system 102 (672). The host computing system 102 may use the tcp_to_spi( ) API to convert the command to a spi_write ("start firmware update") message, which is sent to the SMC 122. The SMC 122 may transmit this message to the microcontroller 118. The microcontroller 118 may then determine whether TLS metadata (e.g., in the TLS header) of this message is valid (674). If it is not, the microcontroller 118 may abort any secure data transfer and return to listening for memory read or write commands. If the TLS metadata is valid, the server 105 receives confirmation from the NVM device 110 and may begin writing to the NVM 120 row by row.

More specifically, the host computing device 102 will convert a tcp_write("row 1") command to an SPI command, which is sent on to the microcontroller 118 by the SMC 122 (676). The microcontroller 118 may then trigger the crypto accelerator 140 to decrypt the ciphertext data (e.g., of the parsed data) of row 1 (678) and verify the hash-based message authentication code (HMAC) generated from the decrypted data (680). Verification of the HMAC is one implementation of verification, and others are envisioned as employed by other cipher suite code. If the HMAC (or other cipher suite code) is not verified, the microcontroller 118 may abort the data transfer process (as before in response to the TLS metadata not being verified). Once the microcontroller 118 receives confirmation of verification from the crypto accelerator 140, the microcontroller 118 may write the row (e.g., row 1) of the data of the firmware update to the target address in the parsed SPI packet (682). The microcontroller 118 may further report, via the SMC 122 and host computing system 102, to the server 105 that the row (e.g., row 1) of data has been successfully written (684). The server 105 may then determine whether an additional row of data in the firmware update exists (688). If yes, the server 105 may generate a next secure write command that is converted again (as been discussed herein) to an SPI packet that is sent to the SMC 122, and eventually to the microcontroller 118 to repeat blocks 676 through 684 for each additional row. In this way, the server 105 stays in control of continued writing of the firmware update to the NVM device 110, and each row of data is decrypted and authenticated before another row is written.

Once there are no more rows, the server 105 may take steps to finish the firmware update (690). For example, the server 105 may send a tcp_write("finish firmware update") command that, once making its way to the microcontroller 118, causes the microcontroller 118 to trigger the crypto accelerator 140 to generate a digest hash of a new image, e.g., mxcrypto_sha256("new image"). This hash result may be sent back to the microcontroller 118 and on to the server through the SMC 122 and the host computing device 102. The server 105 may compare the hash result with a pre-stored hash of an image of the firmware update, and thereby confirm the firmware update successfully installed. The TCP connection with the host computing device 102 that facilitated the firmware update with the NVM device 110 may then be terminated (block 695 in FIG. 6).

While the methods discussed herein are explained primarily with reference to performing a firmware update at the NVM device 110, the server 105 (or other remote computing device) may also communicate securely with the NVM device 110 for other reasons that may involve additional functionality. For example, after a secure handshake has been performed, the server 105 may be able to send access control commands for which the server 105 is authorized as if the server 105 were the host computing system 102. These access control commands may include, for example, the ability to lock or unlock portions of the NVM 120, set different forms of read, execute, and/or write controls on portions of the NVM 120 or on particular programs or firmware stored in the NVM 120.

Further, the server 105 may remotely initiate a diagnostic program at the NVM device 110 or at least remotely and securely retrieve diagnostic information generated by the NVM device 110. Access to such diagnostics data may allow the server 105 to quickly ascertain whether some aspect of hardware and/or software functionality indicates the NVM device 110 has become compromised, and therefore, warrant disconnection of the secure network session established between the server 105 and the NVM device 110. Once the secure network session is disconnected, the methods of FIGS. 6, 6A, and 6B are restarted to establish a new secure session. These method may be updated to check that whatever hardware or software issue that created the need to disconnect the secure network session has been resolved before exchanging confidential data in secure data transfer (FIG. 6B).

Figure 7:
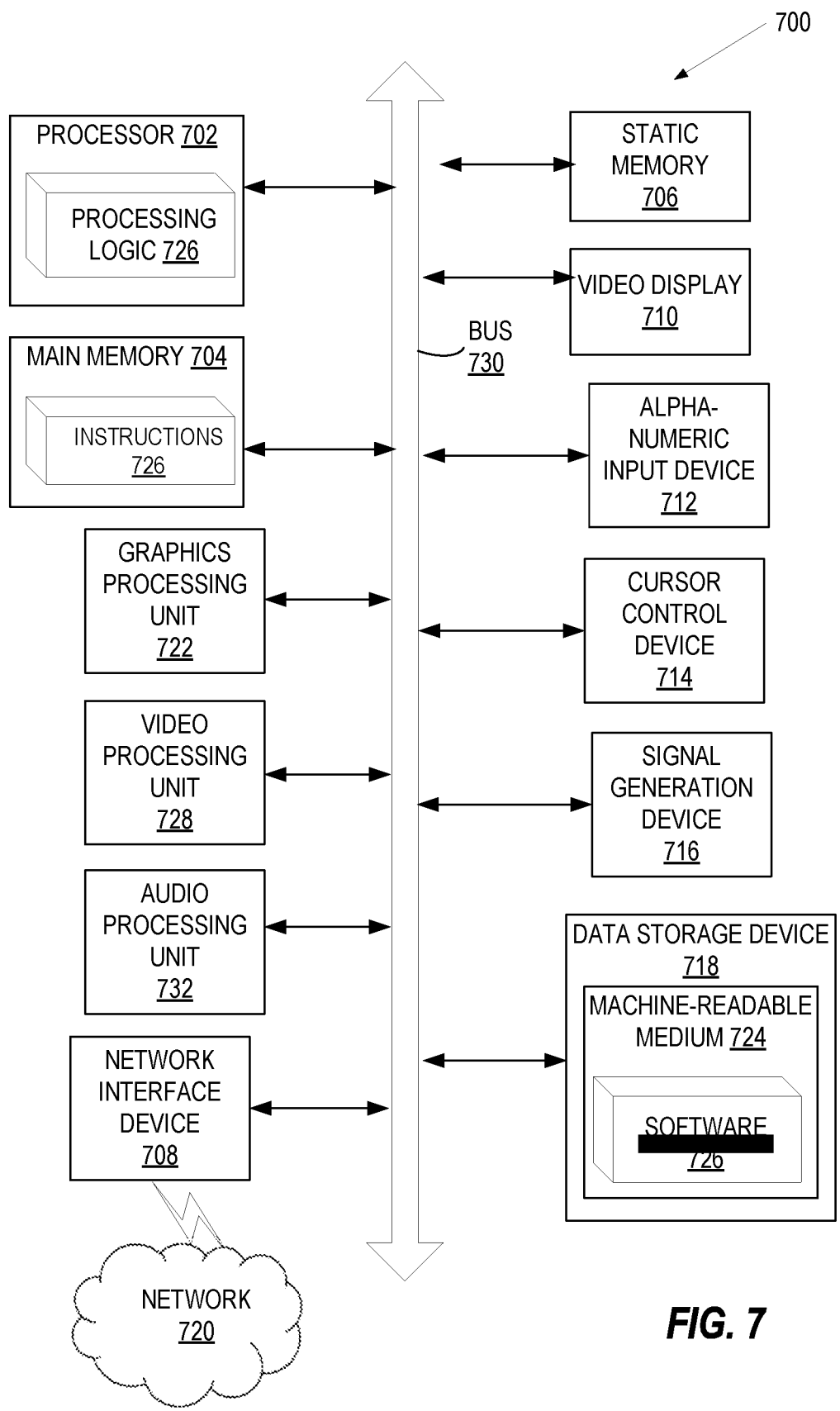
FIG. 7 illustrates a diagrammatic representation of a machine in the example form of a computing system within which a set of instructions, for causing the machine to perform any one or more of the methodologies discussed herein, may be executed.

FIG. 7 illustrates a diagrammatic representation of a machine in the example form of a computing system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a host computing system or computer, an automotive computing device, a server, a network device for an automobile network such as a controller area network (CAN) or local interconnected network (LIN), or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 700.

The computing system 700 includes a processing device 702, main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor device, central processing unit, or the like. More particularly, the processing device may be complex instruction set computing (CISC) microprocessor device, reduced instruction set computer (RISC) microprocessor device, very long instruction word (VLIW) microprocessor device, or processing device implementing other instruction sets, or processing devices implementing a combination of instruction sets. Processing device 702 may also be one or more special-purpose processing devices such as an application specific integrated circuit (ASIC), a field programmable gate array (FPGA), a digital signal processing device (DSP), network processing device, or the like. In one implementation, processing device 702 may include one or more processing device cores. The processing device 702 is configured to execute instructions 726 for performing the operations discussed herein. In one implementation, processing device 702 may be part of the server 105, the host computing system 102, or the NVM device 110.

Alternatively, the computing system 700 may include other components as described herein. The computing system 700 may further include a network interface device 708 communicably coupled to a network 720. The computing system 700 also may include a video display unit 710 (e.g., a liquid crystal display (LCD)), an alphanumeric input device 712 (e.g., a keyboard), a cursor control device 714 (e.g., a mouse), a signal generation device 716 (e.g., a speaker), or other peripheral devices. Furthermore, computing system 700 may include a graphics processing unit 722, a video processing unit 728 and an audio processing unit 732. In another implementation, the computing system 700 may include a chipset (not illustrated), which refers to a group of integrated circuits, or chips, that are designed to work with the processing device 702 and controls communications between the processing device 702 and external devices. For example, the chipset may be a set of chips on a motherboard that links the processing device 702 to very high-speed devices, such as main memory 704 and graphic controllers, as well as linking the processing device 702 to lower-speed peripheral buses of peripherals, such as USB, PCI or ISA buses.

The data storage device 718 may include a computer-readable storage medium 724 on which is stored instructions 726 embodying any one or more of the methodologies of functions described herein. The instructions 726 may also reside, completely or at least partially, within the main memory 704 as instructions 726 and/or within the processing device 702 as processing logic during execution thereof by the computing system 700; the main memory 704 and the processing device 702 also constituting computer-readable storage media.

The computer-readable storage medium 724 may also be used to store instructions 726 utilizing the processing device 702, such as described with respect to FIGS. 1A-1B, and/or a software library containing methods that call the above applications. While the computer-readable storage medium 724 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose hardware selectively activated or reconfigured by a firmware stored therein. Such firmware may be stored in a non-transitory computer-readable storage medium, such as, but not limited to, NVMs, read-only memories (ROMs), random access memories (RAMs), EPROMs, EEPROMs, flash memory, or any type of media suitable for storing electronic instructions. The term "computer-readable storage medium" should be taken to include a single medium or multiple media that store one or more sets of instructions. The term "computer-readable medium" shall also be taken to include any medium that is capable of storing, encoding or carrying a set of instructions for execution by the hardware and that causes the hardware to perform any one or more of the methodologies of the present embodiments. The term "computer-readable storage medium" shall accordingly be taken to include, but not be limited to, solid-state memories, optical media, electromagnetic media, any medium that is capable of storing a set of instructions for execution by hardware and that causes the hardware to perform any one or more of the methodologies of the present embodiments.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. An apparatus comprising:
   a memory controller;
   a static random access memory (SRAM) coupled to the memory controller, the SRAM inaccessible by a host computing system that is communicatively coupled with a server; and
   a non-volatile memory (NVM) device coupled to the host computing system, the NVM device comprising a processing device to:
      receive a communication packet from the server via the host computing system, the communication packet comprising a request to initiate secure communications;
      perform a secure handshake with the server, via communication through the host computing system, using a secure protocol;
      receive data, via the host computing system, from the server within a secure protocol packet;
      store, responsive to detecting a crypto-write command in the secure protocol packet, the secure protocol packet into a crypto buffer of the SRAM;
      parse the secure protocol packet stored in the crypto buffer to retrieve the data;
      retrieve a secure protocol operation identifier and a secure protocol metadata from a header of the secure protocol packet;
      transfer portions of the secure protocol packet from the crypto buffer to the SRAM; and
      process the portions of the secure protocol packet out of the SRAM according to the secure protocol, to include verification of a secure protocol metadata retrieved from the secure protocol packet.

2. The apparatus of claim 1, wherein the secure protocol comprises one of secure sockets layer (SSL) protocol or transport layer security (TLS) protocol, and wherein the secure handshake includes a series of sequencing operations that lead to a series of cryptographic operations.

3. The apparatus of claim 1, wherein the NVM device is a flash memory device, and wherein:
   the memory controller includes a serial peripheral interface (SPI) slave coupled to an SPI master of the host computing system, wherein the secure handshake is performed via transmission of data within SPI packets exchanged between the SPI slave and the SPI master; and
   a cryptographic accelerator in the NVM device is configured to perform cryptographic operations via execution of a cryptographic toolkit that is programmed into the cryptographic accelerator.

4. The apparatus of claim 1, wherein the processing device is further to:
   authenticate the data using at least the secure protocol metadata retrieved from the secure protocol packet; and
   store the data in NVM storage elements of the NVM device.

5. The apparatus of claim 4, wherein the processing device is to provide access, by the host computing system, to the data stored in the NVM storage elements.

6. The apparatus of claim 3, wherein, to process the portions of the secure protocol packet according to the secure protocol, the processing device is further to interact with the cryptographic accelerator to:
   authenticate a row of the data according to a cipher suite code;
   decrypt the row of the data, if encrypted, which generates a row of plaintext data, via use of a session key;
   store the row of plaintext data in NVM storage elements of the NVM device; and
   report back, via the memory controller and the host computing system to the server, that the row of the data has been successfully written to the NVM storage elements.

7. A method comprising:
   receiving, by a processing device of a non-volatile memory (NVM) device, a communication packet from a server via a host computing system that is coupled to the NVM device and communicatively coupled to the server, the communication packet comprising a request to initiate secure communications;
   performing, by the processing device, a secure handshake with the server, via communication through the host computing system, using a secure protocol;
   receiving, using the processing device, encrypted data via the host computing system from the server within a secure protocol packet;
   storing, by the processing device responsive to detecting a crypto-write command within the secure protocol packet, the secure protocol packet into a crypto buffer of static random access memory (SRAM) of the NVM device;
   parsing, by the processing device, the secure protocol packet stored in the crypto buffer to retrieve the encrypted data;
   retrieving, by the processing device, a secure protocol operation identifier and secure protocol metadata from a header from the secure protocol packet;
   transferring, by the processing device, portions of the secure protocol packet from the crypto buffer to the SRAM; and
   processing, by the processing device, the portions of the secure protocol packet out of the SRAM according to the secure protocol, to include verification of the secure protocol metadata.

8. The method of claim 7, wherein performing the secure handshake comprises exchanging secure protocol data within serial peripheral interface (SPI) packets with the host computing system.

9. The method of claim 7, wherein the secure protocol comprises one of secure sockets layer (SSL) protocol or transport layer security (TLS) protocol, and wherein the secure handshake includes a series of sequencing operations that lead to a series of cryptographic operations.

10. The method of claim 7, wherein performing the secure handshake with the server comprises generation of a session key of a pair of session keys, the session key being inaccessible to the host computing system, the method further comprising:
   decrypting, by the processing device using the session key, the encrypted data to generate plaintext data; and storing, by the processing device, the plaintext data in NVM storage elements of the NVM device.

11. The method of claim 10, further comprising providing access, by the host computing system, to the plaintext data stored in the NVM storage elements.

12. The method of claim 7, further comprising authenticating the encrypted data using at least the secure protocol metadata retrieved from the secure protocol packet.

13. The method of claim 10, wherein the processing further comprises:
- authenticating, by a cryptographic accelerator of the NVM device, a row of the encrypted data of the secure protocol packet according to a cipher suite code;
- decrypting, by the cryptographic accelerator using the session key, the row of the encrypted data, generating a row of plaintext data;
- storing the row of plaintext data in the NVM storage elements; and
- reporting back, via the host computing system to the server, that the row of the encrypted data has been successfully written to the NVM storage elements.

* * * * *